(12) United States Patent
Lai

(10) Patent No.: US 11,817,016 B2
(45) Date of Patent: Nov. 14, 2023

(54) SMART DOOR SIGN WITH INTEGRATED IOT DEVICES AND WIRELESS SIGNAL REPEATERS

(71) Applicant: Joseph Lai, Torrance, CA (US)

(72) Inventor: Joseph Lai, Torrance, CA (US)

( * ) Notice: Subject to any disclaimer, the term of this patent is extended or adjusted under 35 U.S.C. 154(b) by 583 days.

(21) Appl. No.: 17/120,111

(22) Filed: Dec. 12, 2020

(65) Prior Publication Data

US 2021/0183278 A1 Jun. 17, 2021

Related U.S. Application Data

(63) Continuation of application No. 62/946,996, filed on Dec. 12, 2019.

(51) Int. Cl.

| | | |
|---|---|---|
| H04L 12/24 | (2006.01) | |
| H04L 41/0806 | (2022.01) | |
| G09F 13/00 | (2006.01) | |
| G09F 13/22 | (2006.01) | |
| H04W 88/04 | (2009.01) | |
| H04W 84/18 | (2009.01) | |
| H04W 4/90 | (2018.01) | |
| G08B 25/00 | (2006.01) | |

(52) U.S. Cl.
CPC ......... *G09F 13/005* (2013.01); *G08B 25/003* (2013.01); *G09F 13/22* (2013.01); *H04W 4/90* (2018.02); *H04W 84/18* (2013.01); *H04W 88/04* (2013.01); *G09F 2013/222* (2013.01)

(58) Field of Classification Search
CPC .. G09F 13/22; G09F 2013/222; G09F 27/005; G09F 11/02; G09F 13/00; G09F 13/005; G09F 13/02; G09F 13/04; G09F 13/0409; G09F 13/045; G09F 13/34; G09F 15/0037; G09F 19/008; G09F 19/04; G09F 2007/1878; G09F 2027/001; G09F 27/00; G09F 27/004; G09F 9/30
See application file for complete search history.

(56) References Cited

U.S. PATENT DOCUMENTS

| | | | |
|---|---|---|---|
| 9,378,601 | B2 | 6/2016 | Ricci |
| 10,685,383 | B2 * | 6/2020 | Soni ...................... H04L 67/535 |
| 11,349,707 | B1 * | 5/2022 | Gerstberger ........... H04N 7/186 |
| 11,393,108 | B1 * | 7/2022 | Modestine ........... G06V 10/141 |

(Continued)

FOREIGN PATENT DOCUMENTS

CN 111754896 7/2020

OTHER PUBLICATIONS

Harbor Freight selling a Solar House Address Number Plaque . . . www.harborfreight.com/search?q=address%20sign.

*Primary Examiner* — Shin H Kim

(57) ABSTRACT

Old address signs are retrofitted, incorporated and integrated with new electronic devices for navigation aid, Internet and IOT (Internet Of Things) related applications. New smart address sign with Internet connections has the capabilities of remote sensing and detecting useful information for residential homes and business offices. Useful information is gathered, stored, processed and relayed for applications of improving home and office efficiency, security and safety related solutions. New hardware and software built into the smart address signs also serve as wireless signal repeating/relaying base stations.

20 Claims, 7 Drawing Sheets

(56) References Cited

U.S. PATENT DOCUMENTS

| | | | |
|---|---|---|---|
| 2009/0164042 A1* | 6/2009 | Handfield | G07F 11/62 700/214 |
| 2011/0307309 A1* | 12/2011 | Forster | G09F 13/02 40/559 |
| 2012/0290109 A1* | 11/2012 | Engelberg | G16H 20/30 700/91 |
| 2014/0358281 A1* | 12/2014 | Lipton | G09F 27/00 40/493 |
| 2016/0345176 A1* | 11/2016 | DeWitt | H04W 4/029 |
| 2017/0228804 A1* | 8/2017 | Soni | G06Q 30/0641 |
| 2018/0233010 A1* | 8/2018 | Modestine | H04N 7/186 |
| 2018/0233025 A1* | 8/2018 | Modestine | G06T 7/292 |
| 2020/0351369 A1 | 11/2020 | Walsh et al. | |
| 2021/0183278 A1* | 6/2021 | Lai | H04W 88/04 |
| 2022/0130293 A1* | 4/2022 | Cline | G09F 27/005 |

* cited by examiner

SMART DOOR SIGN WITH INTEGRATED IOT DEVICES AND WIRELESS SIGNAL REPEATERS

CROSS-REFERENCES

This application incorporates references to both U.S. Provisional Patent Application 62/922,317 filed Sep. 10, 2019 "Smart TV with Built-in IOT (Internet Of Things) Sensor and Detector Devices" and U.S. Provisional Patent Application 62/946,996 filed Dec. 12, 2019 "Smart Door Sign with Integrated IOT Devices and Wireless Signal Repeaters". Joseph Lai is the sole inventor for both of the above provisional patent applications.

FIELD OF THE INVENTION

This invention is about turning a regular address sign into a smart Internet and IOT (Internet Of Things) base station, not only displaying electronic messages but also with sensors/detectors and wireless signal repeaters built-in for home/office security and safety related applications. In addition, the new smart address sign includes the functionality of relaying wireless Internet signals.

BACKGROUND OF THE INVENTION

Why is this invention necessary?
The problems addressed:
1. The Internet has rapidly changed the world. However, the use of Internet related technologies for delivery services are behind. Locating and navigating to the go-to addresses for visitors and service providers is difficult for many reasons. Newer e-commerce service providers such as Uber, Lyft and Amazon have added many new drivers for delivery services. Unlike experienced drivers, new drivers often have more difficulties locating unfamiliar neighborhood addresses when offering delivery services based only on GPS (up to 100 ft radius error range) electronic map information. This has many issues due to low visibility, confusing/distracting environments, outdated address database, poor navigation signal and human error etc.

Humans aren't the only ones with difficulty, the next generation last-mile transportation and delivery services, AI (Artificial Intelligence) based self-driving delivery robots and drones technologies will too. GPS is the only tool available for most applications as of now. Robots/drones would definitely require technologies more sophisticated than current address signs and old GPS technologies to get their jobs done.

2. Modern home and office IOT security/safety related hardware is scattered everywhere. Often there are disorganized, messy wires hanging around, occupying a lot of space, with shortened radio transmission ranges. Multiple hardware and software are difficult to install, tedious to set up, expensive, not environmentally friendly and very awkward to use. While smartphones do have a lot of built-in functions usable for IOT, they are designed to be carried with their owners so they are not ideal for stationary IOT applications.

3. The demands of fast Internet are getting more and more serious as current infrastructure is not only very expensive but also overloaded. Newer, faster wireless cellular phone services, such as 5G (Fifth Generation) will need at least 5 to 10 times more base stations to provide all of their planned offerings.

The inventor's solution:
Almost all homes/offices have address signs. These signs have housings with physical space to accommodate low-cost, low power electronics able to provide new solutions for many new applications. The inventor proposes to integrate all necessary hardware and software inside the smart address signs to solve all the problems as mentioned above.

SUMMARY OF THE INVENTION

This present invention simplifies and improves home/office security applications by integrating all the related hardware and software built into a smart address sign. Useful applications include:
1. Visible illuminated address number/messaging display helps visitors to locate correct home or right business
2. Ability to remotely enter and displaying messages for visitors on the smart address sign
3. Automatically rings doorbell when authorized visitors appear
4. Automatically opens the door for business customers, residents or tenants
5. Provides voice or video intercom services
6. Ability to take pictures or videos with embedded digital camera
7. Detection of visitor's body temperature remotely to avoid infection due to viruses i.e. COVID-19
8. Motion detection with PIR (Passive Infrared) sensors of visitors or intruders
9. Detection of harmful gas or radiation as a smoke/radiation alarm
10. Detection of inhabitant emergencies through medical alert systems or vital sign signal monitoring
11. Detecting, gathering and reporting outdoor temperature, humidity and barometric information for NOAA and other agencies
12. Monitoring, reporting wildfire, earthquake/Tsunami in the area and generation of warning signals
13. Sending visual/radio beacon and homing signals to help visitors locate the addresses
14. Repeating signals as an outdoor wireless base station for relaying wireless signals such as cellular phone 2G, 3G, 4G, 5G, WiFi, Bluetooth, LoRa, RFID, military, police, public service, amateur radio operations and all others to form an emergency and non-emergency crowd-based terrestrial mesh network

DETAILED DESCRIPTION

Figure 1:
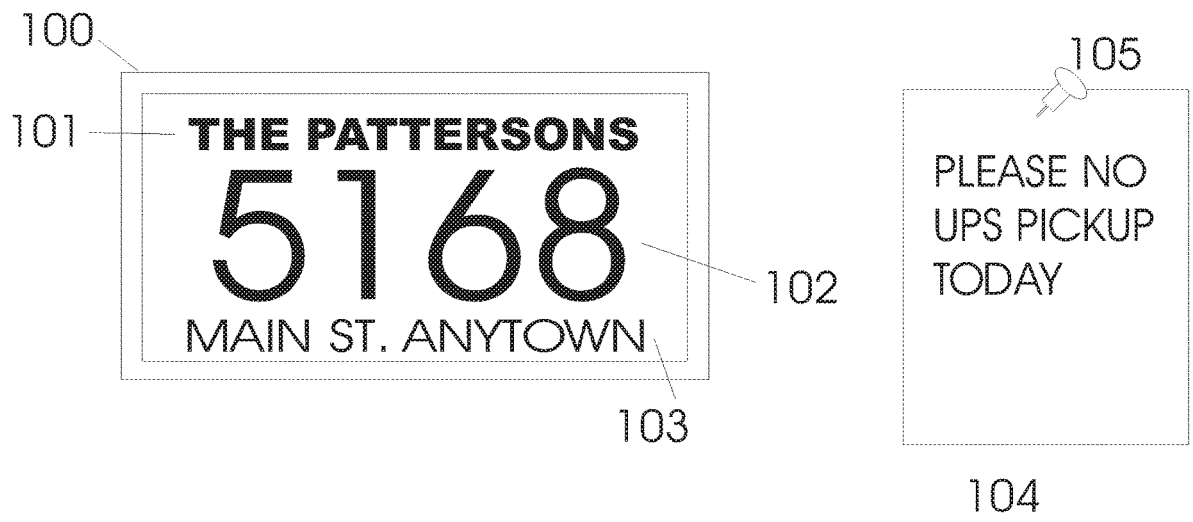
FIG. 1 illustrates (as Prior Art) a traditional address sign has no electronics inside

FIG. 1 contains prior art of an old regular address sign with a box (100) and the residence name (101), address numbers (102) and the street name (103). Some of the old regular address signs (not shown) do not have a box, no residence name nor the street names but just the street numbers. A typed or handwritten note/message (104) is posted by a thumbtack (105) nearby to notify the delivery driver. These old address signs are made of wood, metal, plastic and all other materials from hardware stores. Almost all addresses must have address signs to receive services such as mail, package, and in-person delivery and pick up/drop off services. The old fashioned address signs are normally permanently mounted high on the walls or attached to the doors.

Figure 2:
FIG. 2 illustrates a smart address sign with electronic digital display visible in the dark

FIG. 2 shows the present invention of a new smart address sign with a box (100) and new electronically displayed residence or homeowner name (201) and address numbers (202) plus the street name (203). The new digital sign can be made of modern LED, LCD, OLED, micro LED, plasma or E-paper of direct viewing or DLP, laser light projected images. For outdoors in the bright sunlight, LED is a low-cost, long-lasting solution offering high visibility.

Smart address signs allow interactive digital displays. Address numbers and street names can be changed for any reason. For example, a smart address sign can be relocated as someone moving from an old apartment to a new house, changing business location etc.

Figure 3:
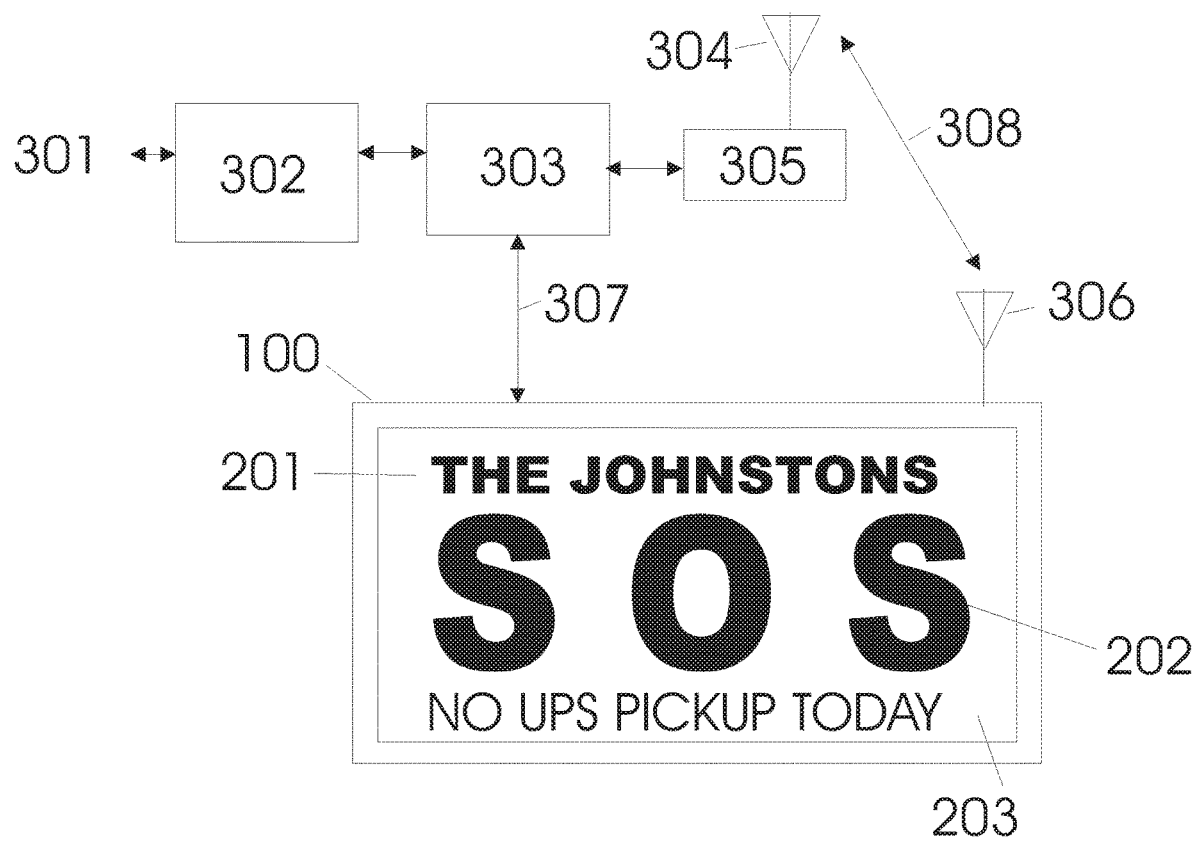
FIG. 3 illustrates a smart address sign without IOT devices connected

FIG. 3 shows the modern day Internet connection from Internet Service Providers to the smart address sign located at the residence/business. Connection to the Internet (301) through a modem (302) (modulator demodulator) is required. Typical Internet connections are either wired from DSL or Cable through electrical, fiber optical wires or wireless services from cellular phones (2G, 3G, 4G LTE, 5G), terrestrial microwave or satellite linked Internet Service Providers. Modem (302) has transceivers built-in which then forward the Internet signal/data to either a wired router (303) or wireless routers (305). Electrical/optical wires are usable to establish a wired link (307) of wired signals to the smart address sign. From the wireless router (305), a wireless signal link is established from antenna (304) with wireless link (308) to the smart address sign. Note (202) S O S sign is displayed instead of address numbers in case of an emergency.

Figure 4:
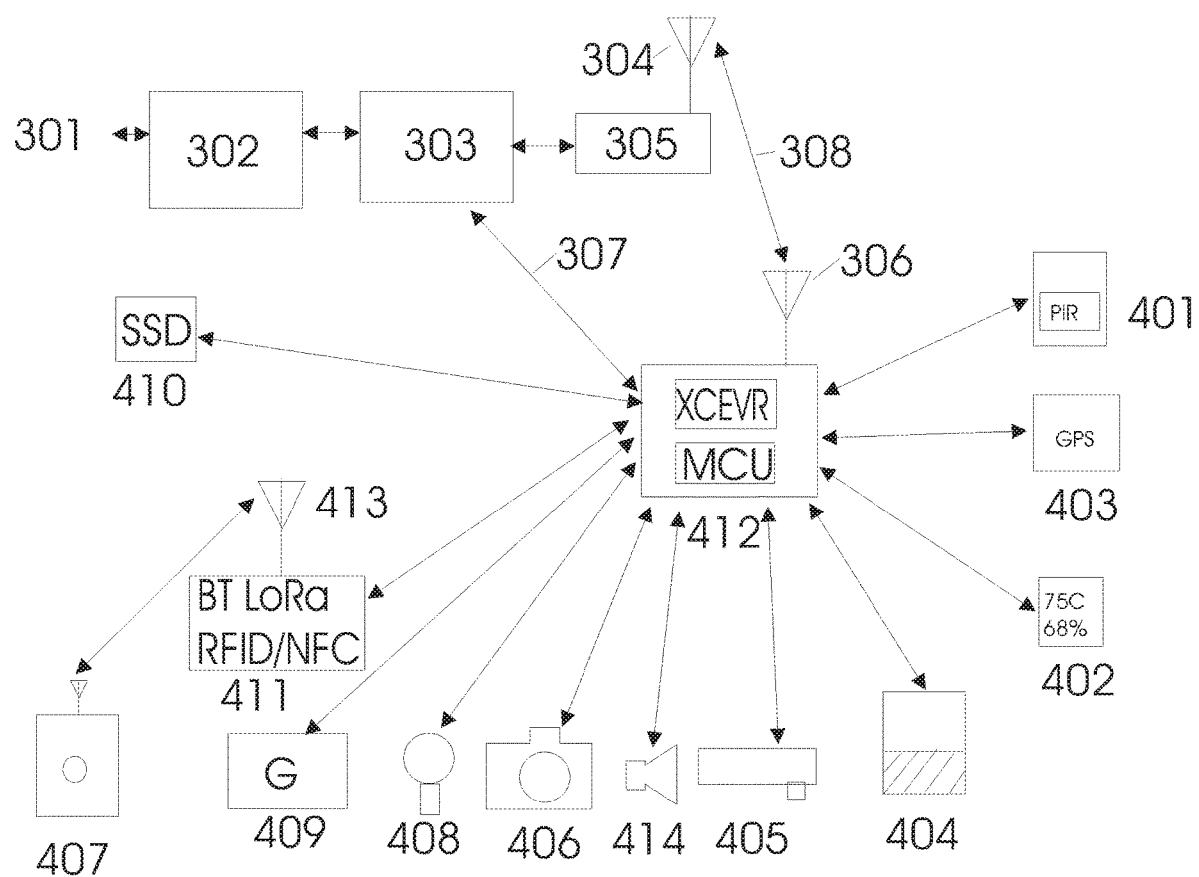
FIG. 4 illustrates a smart address sign and all IOT devices, but not integrated

FIG. 4 shows the block diagram inside the present invention of the smart address sign. The core of the operation which has an MCU (412) (Micro Controller Unit) and transceivers to receive and transmit the signal by the antenna (306) through a wireless link (308) to antenna (304) then connect to Internet Service Provider (310).

There are many IOT application sensors that can be built-in with unique applications. PIR (Passive Infrared) sensor (401) detects mostly nearby humans and/or animals within 7 to 10 meters. It is very useful for security applications such as warning of intruders or visitors. PIR sensor (401) can send signals to MCU (412) to turn on the flashlight (408) to scare intruders away and/or assist friendly visitors in the dark. GPS receiver (403) sends out location data to delivery service providers so they may navigate and to pinpoint the exact locations needed for services. Environment sensor (402) measures temperature, humidity and barometric pressure information. Flood or water leak detector (404) that can wirelessly (not shown) connected to a sensor for boaters, low elevation residences or underground garage water level monitoring. Gas/radiation detector (405) is for detecting harmful gas and radiation, such as smoke, PM (Particulate Matter) 2.5 micron and other pollutants. If smoke is detected, MCU (412) can automatically call/text/email 911 or the fire department for reporting fire trouble.

Camera (406) inside the smart address sign helps viewing, transmitting to MCU (412) and recording images onto hard drives (410) of the nearby activities with a loud speaker/microphone (412) adding audio applications and also serves as a remote intercom. Accelerometer (409) is for detecting motion such as earthquakes. Sophisticated cameras (406) with thermal image capability can pre-detect or facially analyze the incoming visitors who have fevers with infected diseases such as flu' or COVID-19 symptoms. Data storage devices (410) such as flash memory drive, hard drive or Solid-State Drive (SSD) can receive, store and forward data to relieve streaming video related Internet congestion. In case of theft of the smart address sign, PIR (401) and accelerometer (409) will trigger the MCU (412) to turn-on camera (406) and transmit GPS (403) information to security and law enforcement agencies.

Wearable or personal remote alert device (407) is for medical emergency activities. There is an additional transceiver (411) in the smart address sign for receiving the signals. Applications such as neighborhood watch, medical assistance and all kinds of accidents will quickly manually or automatically summon help by triggering in-range transceivers (411) of all nearby neighborhood smart address signs. In case of emergency a loudspeaker (414) can work as a siren to alert nearby residents or visitors that there is a situation. Both the main antennas of transceivers (wireless modems) (306) (413) also could serve as radio beacon signal transmitters to help visitors to triangulate or trilaterate to pinpoint the exact location with directional radio antennas. It is very useful for new generation robots, drones and/or self-driving vehicles as new visitors to navigate their ways to provide services.

Additional radio/transceiver (411) with antenna (413) is a narrow bandwidth transceiver compared to the main broadband transceiver (412). Narrow band radio signals are Bluetooth, LoRa, Zigbee and/or RFID related applications for longer range, lower data rate communication applications.

Figure 5:
FIG. 5 illustrates a smart address sign with built-in electronics behind the sign

FIG. 5 shows the interface from the smart address sign to the connections. The smart address sign can electronically change the message from street name to a welcome message. The numbers and names can also be changed either through a smartphone app with Bluetooth/WiFi locally or done remotely through Internet service. Useful interactive messages such as: when the post carrier shows up, the sign will display a homeowner out of town message triggered by a PIR sensor (401) and a remote alert device (407). The smart address sign reverts back to regular display once the post carrier is gone to conserve energy and offers more privacy.

Figure 6:
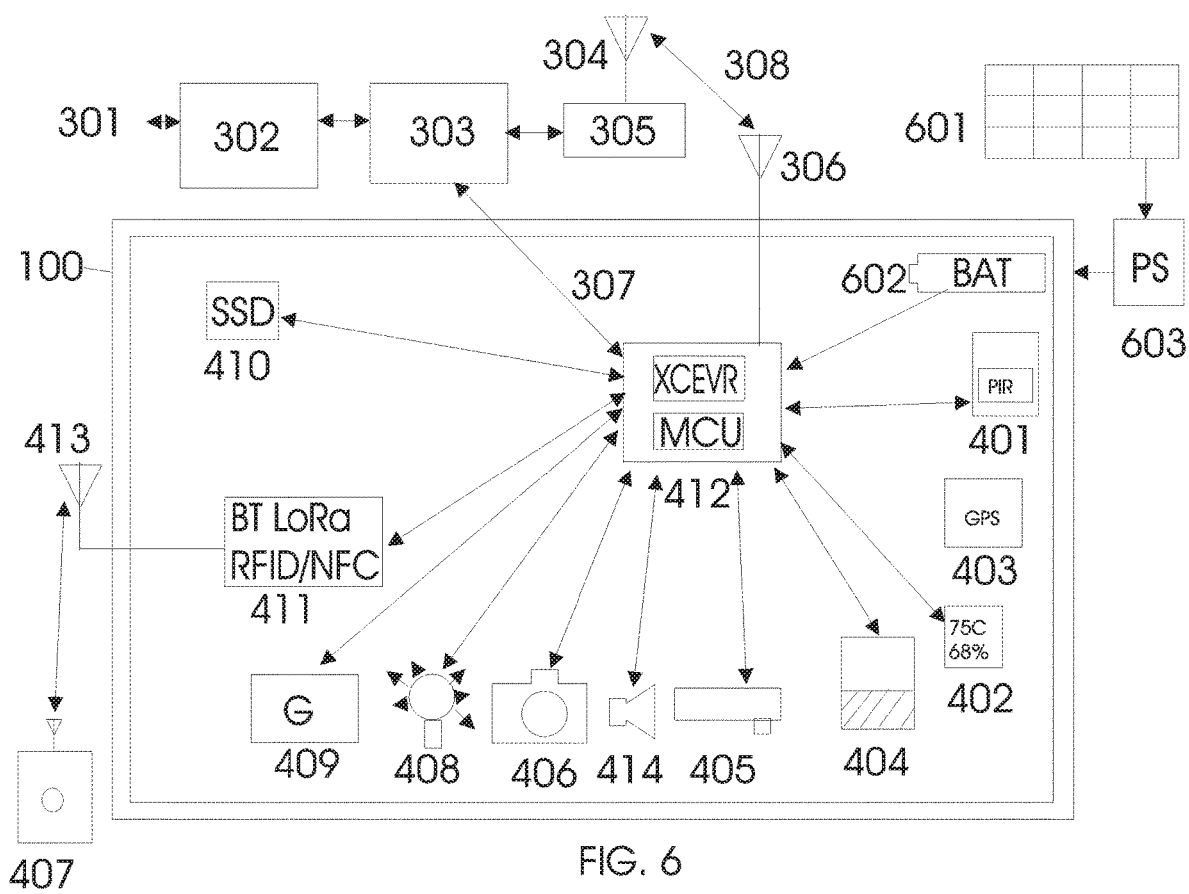
FIG. 6 illustrates a smart address sign with integrated IOT electronics inside the sign

FIG. 6 shows the inside of the box (100) hardware block diagram. Solar panel (601) is for supplying the environmentally friendly power source with a regular AC power supply (603) to feed a back-up power battery pack (602) for the smart address sign. Backup power is needed in case of power outages. The smart address sign enclosure/box would be weatherproofed for the outdoor environment.

Antennas (306) and (413) are for wireless transceivers to communicate outside of the smart address sign box. Antennas can be inside for a shorter distance and outside for much longer ranges. Antennas can be a simple dipole, Yagi, beamforming phased array or suitable forms of antennas based on frequencies and power gain requirements.

The list of above mentioned hardware can be scaled down or up based on requirements and modular designs. All related modules of functionality are suggested to have a design of easy expandability with connection slots for easier future upgrade. For example, if water detection (404) is not necessary, no need to include. In case the transceivers (411, 412) get obsolete or fail, just remove the old and install/replace with the latest technology transceivers.

Figure 7:
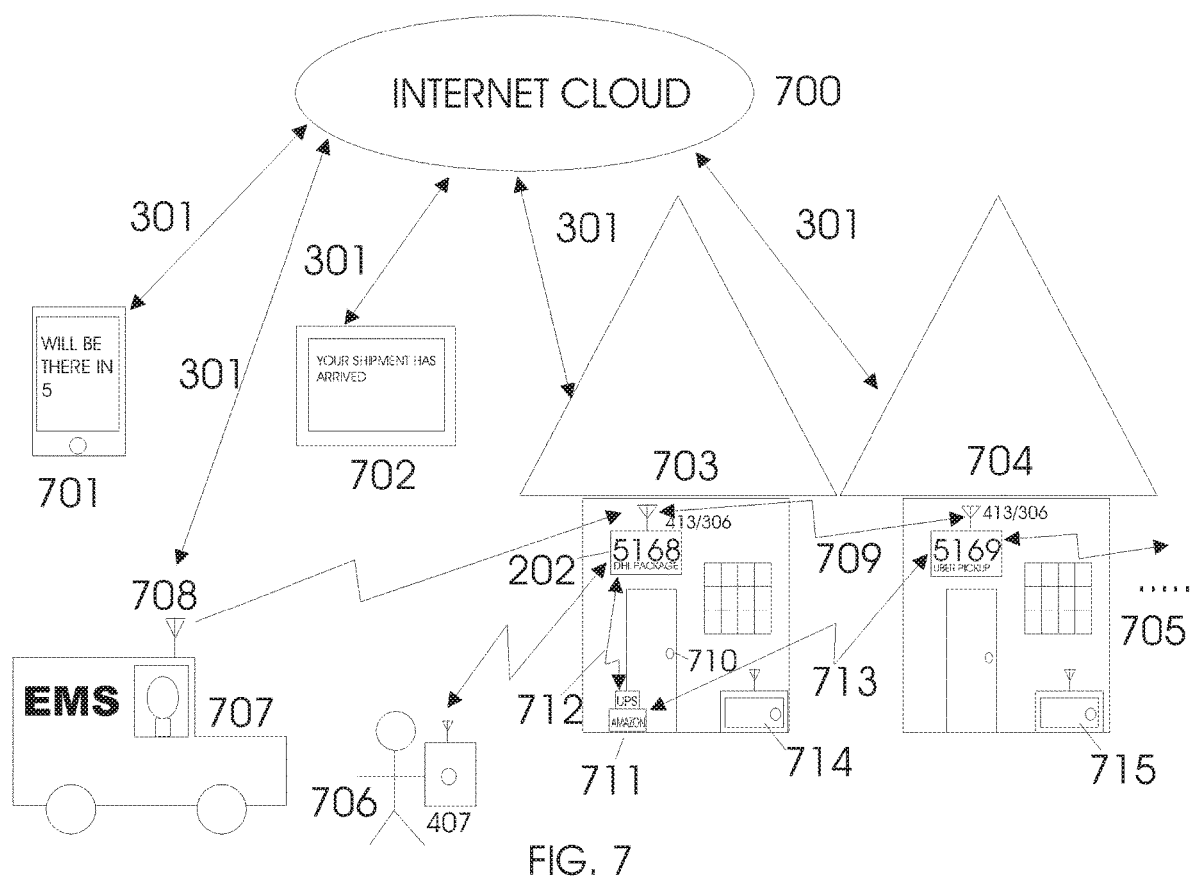
FIG. 7 illustrates a smart address sign as a base-station for wireless communications providing a mesh networks in the neighborhood

FIG. 7 shows the typical application of smart address signs in a typical neighborhood with a house (703) and another dwelling house next door (704) and houses beyond (705). (707) Delivery vehicle drivers are assisted by their vehicle antennas (708) transmitting search signals to locate the address 5168 for delivery or pick up of packages. After vehicle antennas (708) send the request signal received by smart address sign antennas (413, 306), the smart address sign is turned on, with optional audio sound alert or on/off blinking lights to indicate this is the address for service. Only 5168 will respond to the service vehicle (707) request not the 5169 address. The request signal can be sent by direct radio signal such as a Bluetooth module or from a cellular phone by email/text to the Internet then to the smart address sign. However, if there is no Internet signal for house 5168, the 5169 could work as a backup relaying base station for 5168 offers radio link (709) as a crowd based wireless mesh network.

Nearby visitors, homeowners or neighbors (706) with emergency alert devices (407) can also connect to antenna (306) to summon help if needed. All signals can connect to Internet Service Providers through either wired or wireless connectivity (301) to Internet cloud (700) and send notification to wireless devices (701, 702) in response to the request.

Electronic door lock (710) can be locked and unlocked by camera (406) with facial recognition, RFID (407) or remote control devices (407) controlled by MCU (412) of smart address sign for easy entry. The new electronic locker box (714) (715) also can receive, store and forward packages by remotely access controlled by MCU (412) of smart address signs.

Once the package (711) is delivered to the address with RFID (407) tags with antennas, it can be guarded/tracked by mesh networks of electronic geo-fencing monitors via radio links of homeowner's (712) and (713) next door neighbor's smart address sign to prevent theft.

CONCLUSION

New smart address signs presented in this invention are ideal places to install and integrate IOT hardware and software inside for future generations of security and safety applications and beyond.

I claim:

1. A smart address sign, comprising:
a) a housing;
b) a digital signage display;
c) a plurality of sensors; and
d) a plurality of modems;
whereby said digital signage display, said sensors and said modems are inside said housing providing digital signage, Internet Of Things (IOT) and Internet signal relaying applications.

2. The smart address sign in claim 1, wherein said modems are wired and/or wireless.

3. The smart address sign in claim 1, wherein said digital signage display is for displaying street address numbers to assist visitors in locating places they wish to visit.

4. The smart address sign in claim 1, wherein said digital signage display is for displaying relevant messages to said visitors.

5. The smart address sign in claim 1, wherein said sensors are incorporated with camera, microphone, speaker, motion detection, water detection, proximity detection, wireless sensor, gas/radiation detection, temperature/humidity/barometric indicators and GPS receiver for said IOT applications.

6. The smart address sign in claim 5, wherein said motion detection sensor is automatically turning on flashlights for said visitor in dark.

7. The smart address sign in claim 1, wherein said digital signage display is blinking on and off wirelessly triggered by nearby said visitors sending request signals to said wireless sensors.

8. The smart address sign in claim 2, wherein said wireless modems are sending location beacon signals as navigation aid to assist said visitors.

9. The smart address sign in claim 1, wherein said smart address signs within radio communication ranges are forming crowd based Internet mesh networks by relaying wireless signals from first said smart address sign to second said smart address sign and so forth to other wireless modems then connect to Internet.

10. The smart address sign in claim 9, wherein said wireless signals are for 2G, 3G, 4G LTE, 5G cellular phone, WiFi, Bluetooth, RFID, LoRa and Zigbee related radio transceivers.

11. The smart address sign in claim 9, wherein said wireless signals are for Internet, military, public service, business, amateur, WiFi and cellular phone radio applications.

12. The smart address sign in claim 9, wherein said wireless signals are received, stored, forwarded and routed to Internet users.

13. The smart address sign in claim 2, wherein said wired modems are connected to networks of electrical coaxial cables, Ethernet wires and/or optical fibers Internet service providers.

14. The smart address sign in claim 2, wherein said wireless modems are connected to networks of cellular 2G, 3G, 4G LTE, 5G, WiFi and/or satellites Internet Service Providers.

15. The smart address sign in claim 1, wherein said digital signage display is made based on LED, OLED, QLED, LCD, E-Ink, plasma, DLP, laser projecting, incandescent bulb and/or neon light technologies.

16. The smart address sign in claim 1, wherein said IOT applications are for neighborhood watch, safety and security applications.

17. The smart address sign in claim 5, wherein said sensors are usable for scientific and medical research applications.

18. The smart address sign in claim 5, wherein said sensors are usable for fire, earthquake and/or tsunami detection and early warning applications.

19. The smart address sign in claim 3, wherein said visitors are humans and/or robots.

20. The smart address sign in claim 1, wherein said smart address signs are for commercial offices, retail buildings, residential houses and/or apartments.

* * * * *